United States Patent
Liu et al.

(10) Patent No.: US 11,858,276 B2
(45) Date of Patent: Jan. 2, 2024

(54) RESISTIVE LIQUID METAL LEVEL SENSING IN A MAGNETOHYDRODYNAMIC (MHD) JETTING SYSTEM

(71) Applicant: Additive Technologies, LLC, Palm City, FL (US)

(72) Inventors: Chu-heng Liu, Penfield, NY (US); Paul J. McConville, Webster, NY (US); David L. Knierim, Wilsonville, OR (US)

(73) Assignee: Additive Technologies, LLC, Palm City, FL (US)

( * ) Notice: Subject to any disclaimer, the term of this patent is extended or adjusted under 35 U.S.C. 154(b) by 69 days.

(21) Appl. No.: 17/131,498

(22) Filed: Dec. 22, 2020

(65) Prior Publication Data
US 2022/0194088 A1    Jun. 23, 2022

(51) Int. Cl.
*B41J 2/175*    (2006.01)
*G01F 23/24*    (2006.01)

(52) U.S. Cl.
CPC .......... *B41J 2/17566* (2013.01); *G01F 23/24* (2013.01); *G01F 23/241* (2013.01); *B41J 2002/17579* (2013.01)

(58) Field of Classification Search
CPC ........... G01F 23/24–245; B41J 2/17566; B41J 2002/17579
See application file for complete search history.

(56) References Cited

U.S. PATENT DOCUMENTS

| | | | | |
|---|---|---|---|---|
| 4,646,569 A * | 3/1987 | Cosser | ................... | G01F 23/24 307/118 |
| 5,386,224 A * | 1/1995 | Deur | ................... | B41J 2/17593 347/88 |
| 5,583,544 A * | 12/1996 | Stamer | ................. | B41J 2/17503 347/7 |
| 7,556,326 B2 | 7/2009 | Knierim et al. | | |

(Continued)

FOREIGN PATENT DOCUMENTS

DE    4226813 A1 *    2/1994    ............... B67C 3/06

OTHER PUBLICATIONS

Sukhotskiy et al., "Magnetohydrodynamic Drop-on-Demand Liquid Metal 3D Printing," Solid Freeform Fabrication 2017: Proceedings of the 28th Annual International, Solid Freeform Fabrication Symposium—An Additive Manufacturing Conference, 1806-1811.

*Primary Examiner* — Justin N Olamit
(74) *Attorney, Agent, or Firm* — MH2 Technology Law Group LLP

(57) ABSTRACT

An implementation of the present teachings includes a resistor structure for measuring a level of a print material such as a liquid metal print material within a reservoir of a printer such as a magnetohydrodynamic printer. The resistor structure includes a first electrode and a second electrode that are physically and electrically separated from each other. When positioned within the reservoir, the liquid metal physically contacts the first electrode and the second electrode. An electrical resistance between the first and second electrodes changes depending on the level of the print (Continued)

material within the reservoir. As the level of the print material decreases, the electrical resistance between the first electrode and the second electrode increases. The electrical resistance can be measured and used to determine a level of the print material within the reservoir.

12 Claims, 13 Drawing Sheets

(56) References Cited

U.S. PATENT DOCUMENTS

| | | | |
|---|---|---|---|
| 8,486,240 B2* | 7/2013 | Fuji | C25B 11/031 |
| | | | 429/534 |
| 9,067,425 B2* | 6/2015 | Blowfield | B41J 2/17553 |
| 11,137,449 B1* | 10/2021 | De Cicco | H05B 45/30 |
| 11,305,549 B2* | 4/2022 | Ishizawa | B41J 2/1752 |
| 11,467,017 B2* | 10/2022 | Arnold | G01F 23/0007 |
| 2020/0240825 A1* | 7/2020 | Merz | G01F 23/22 |

\* cited by examiner

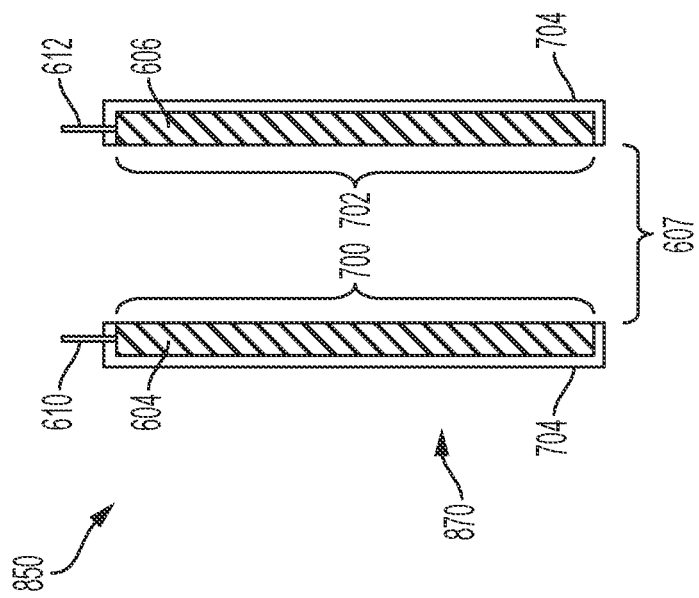
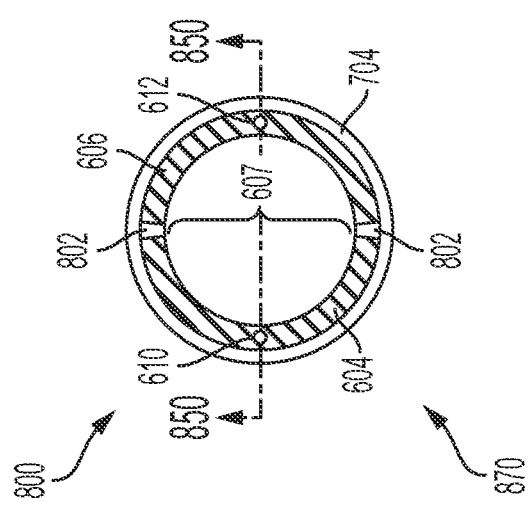
FIG. 8

RESISTIVE LIQUID METAL LEVEL SENSING IN A MAGNETOHYDRODYNAMIC (MHD) JETTING SYSTEM

TECHNICAL FIELD

The present teachings relate to the field of printing, such as three dimensional printing, functional printing, and other printing and, more particularly, to methods and structures for printing high melting point temperature materials such as metals and metal alloys.

BACKGROUND

Drop-on-demand (DOD) printers that are capable of jetting or ejecting high temperature materials such as a metal are being developed and improved. One type of printer employs magnetohydrodynamic (MHD) technology to manipulate an electrically conductive print fluid or print material such as liquid metal print material, for example molten aluminum, using a magnetic field to eject a single drop or volume of the print material from a nozzle. During a metal printing process, metal in a solid form can be supplied from a wire spool to a supply reservoir of the printer. The solid metal is heated within the supply reservoir to a temperature sufficient to melt the solid metal and to maintain a level of liquid metal within the supply reservoir. When the level of liquid metal within the supply reservoir is sufficient, the liquid metal is passed from the supply reservoir through a channel to the nozzle, and printing can be initiated. The liquid metal that is ejected from the nozzle onto a surface is replaced so that a desired level or volume of liquid metal is maintained within the supply reservoir. Thus printing of liquid metal can be continuous.

The level of liquid metal within the supply reservoir can be monitored using, for example, a laser that emits a laser beam onto an upper surface of the liquid metal within the supply reservoir. The laser beam is reflected from the upper surface of the liquid metal, and the reflected laser beam is detected using one or more photosensors (hereinafter, collectively, "a photosensor"). The position of the reflected laser beam on the photosensor will vary depending on the level of the liquid metal within the reservoir, and the position of the reflected laser beam on the photosensor can be used to calculate the level of the liquid metal within the reservoir. When the level of the liquid metal is sufficiently low, additional solid metal can be supplied from the wire spool and melted within the supply reservoir to maintain or increase a desired level of liquid metal within the supply reservoir.

A method and structure that allows for improved measurement of a liquid metal within a supply reservoir of a metal printer would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, a printer includes a block that at least partially defines a reservoir for a print material, a first electrode positioned within the reservoir, a second electrode physically spaced from the first electrode by a gap, and an instrument for measuring an electrical resistance between the first electrode and the second electrode when the print material is positioned within the reservoir, wherein the first electrode defines at least a portion of a hollow center of an electrode subassembly.

Optionally, the printer can include a print material within the reservoir, wherein the print material is liquid metal. Further optionally, both the first electrode and the second electrode, at least in part, can define the hollow center of the electrode subassembly. The first electrode and the second electrode can together define, at least in part, a cylinder, where the hollow center is positioned at a cross section of the cylinder.

In an implementation, the first electrode and the second electrode each include a material selected from the group consisting of a graphite, a ceramic, and/or a graphite-ceramic composite. Optionally, the instrument is an ohmmeter, the first electrode is electrically coupled to the ohmmeter with a first lead, and the second electrode is electrically coupled to the ohmmeter with a second lead. Further optionally, the printer includes a first face defined by the first electrode and a second face defined by the second electrode, wherein the first face and the second face are adjacent to, and facing, each other and are separated by the gap. The printer can further include a liquid metal within the reservoir, wherein the liquid metal electrically contacts the first face and the second face.

In an optional implementation, the printer can further include a printer component positioned within the reservoir. The printer component can include an interior sidewall that defines, at least in part, an inner vessel, an exterior sidewall opposite the interior sidewall, a first surface intersecting the interior sidewall and the exterior sidewall, a second surface opposite the first surface and intersecting the interior sidewall and the exterior sidewall, and a flow path configured for a flow of a print fluid from the inner vessel to an exterior of the printer component. Optionally, the printer component can further include one or more slots that extend from the interior sidewall to the exterior sidewall proximate a first end of the printer component, wherein the printer component is configured such that the flow path is through the one or more slots. The printer component, in plan view, can include a circular shape. Further, the first electrode and the second electrode can be positioned exterior to the inner vessel defined by the printer component. In an implementation, the second electrode can be a sidewall of the reservoir.

In another implementation, a method for forming a printed structure includes providing a print fluid within a reservoir of a printer and between a first electrode and a second electrode, ejecting at least a portion of the print fluid from a nozzle of the printer, thereby decreasing a volume of the print fluid within the reservoir and between the first electrode and the second electrode, measuring an electrical resistance between the first electrode and the second electrode to obtain a resistance measurement, and replacing a volume of the print fluid within the reservoir responsive to a value of the resistance measurement.

Optionally, the providing of the print fluid within the reservoir can provide a portion of the print fluid on a first face of the first electrode and a second face of the second electrode. Further, the providing of the print fluid within the reservoir can provide the portion of the print fluid within a hollow center that is defined, at least in part, by the first electrode.

The first electrode and the second electrode can each include a material selected from the group consisting of a graphite, a ceramic, and/or a graphite-ceramic composite. Optionally, the method can further include replacing the volume of the print fluid by placing a metal wire into a vessel defined by a replaceable inner shell, wherein the replaceable inner shell is positioned within the reservoir. The replaceable inner shell can a first replaceable inner shell, and the method can further include removing the first replaceable inner shell from the reservoir and reinstalling the first replaceable inner shell, or installing a second replaceable inner shell, into the reservoir of the printer.

Optionally, the method can further include repositioning the replaceable inner shell within the reservoir during the ejecting of the at least the portion of the print fluid from the nozzle of the printer using an actuator, removing a dross from an interior sidewall of the replaceable inner shell after removing the replaceable inner shell from the reservoir, then reinstalling the replaceable inner shell into the reservoir.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures:

FIG. 8 depicts a plan view and a cross section of a portion of a resistor subsystem in accordance with an implementation of the present teachings.

Figure 1:
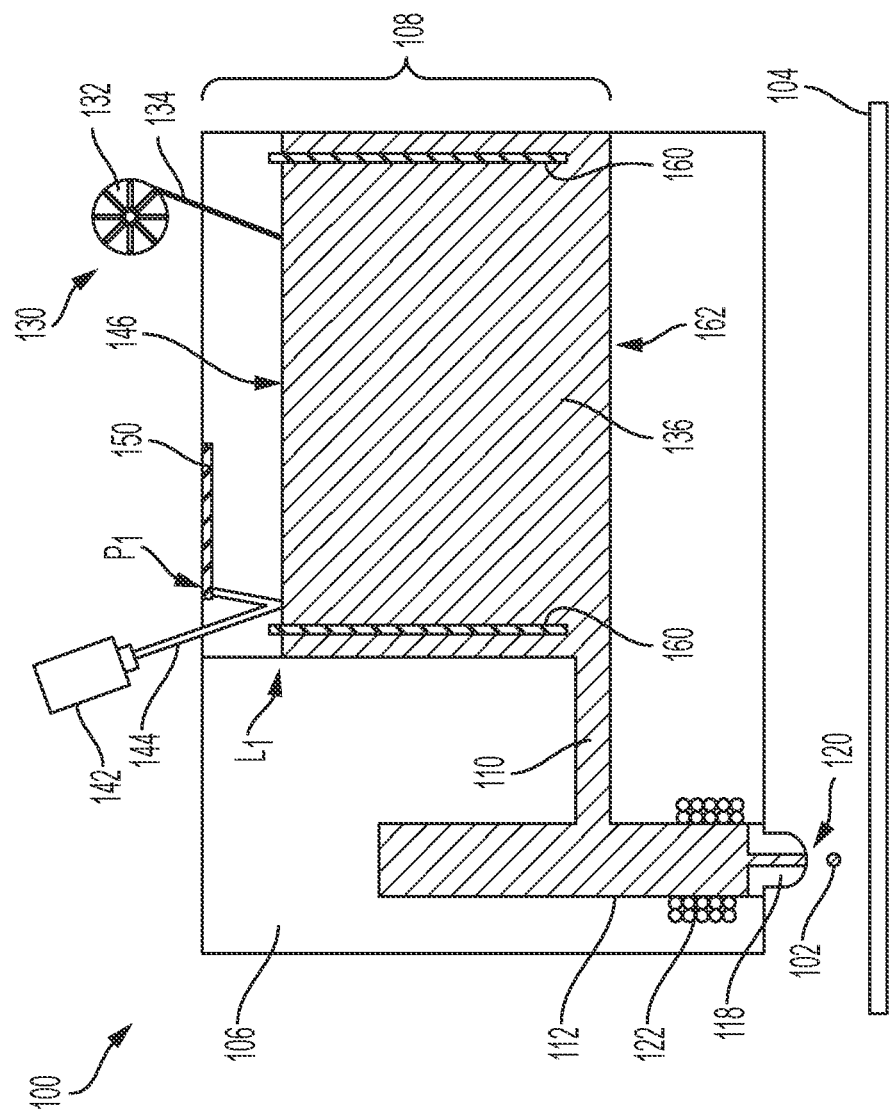
FIG. 1 is a schematic cross section of a printer including an inner shell within a reservoir of the printer according to an implementation of the present teachings.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

As used herein, unless otherwise specified, the word "printer" encompasses any apparatus that performs a print outputting function for any purpose.

As discussed above, the level of liquid print material in a reservoir of a printer, for example liquid metal in a metal printer, can be monitored using a laser that directs a laser beam onto an upper surface of the liquid metal and a photosensor that detects a position of the laser beam that is reflected from the upper surface of the metal onto the photosensor. As the level of the liquid metal decreases and increases, the position of the reflected laser beam on the photosensor changes, and the position can be used to calculate the level of the liquid metal within the reservoir.

One impediment that can interfere with the accurate measurement of the level of liquid metal within the reservoir is the formation of dross on the upper surface of the liquid metal. Dross can be, for example, impurities, contaminants, chemical by-products, or another material that can be introduced from contamination on or within the metal supply. Further, the dross may form from a chemical reaction of two or more reactants within the reservoir of the printer. The dross can be or include, for example, a solid or mostly solid material. The dross can be or include, for example, magnesium oxide (MgO), aluminum oxide ($Al_2O_3$), another material that forms on at least a portion of the upper surface of liquid print material within the reservoir, or combinations thereof. The dross is generally less dense (i.e., lighter) than the liquid print material and thus floats on an upper surface of the liquid print material. One major source of the dross is the supply metal stock. The more material that has run through the system, the more dross can potentially accumulate. In other words, the amount of dross that accumulates within the printer is directly proportional to the amount of print material that has been melted within the reservoir.

The dross can build up and accumulate within the reservoir, particularly on the walls that form the reservoir and across the upper surface of the liquid print material, and can interfere with the ability of the print system to determine the height of the liquid pool within the reservoir. While the level of the liquid print material drops during printing, the position and level of the dross remains fixed within the reservoir. If laser beam reflects from the dross rather than the liquid print material, the position of the laser beam on the photoreceptor does not change with the changing level of the print material. Thus the position of the laser beam on the photoreceptor indicates the fixed position of the dross and not the changing level of the print material. The printer can, for example, stop feeding solid wire into the print reservoir because the position of the reflected laser beam incorrectly indicates that the reservoir is full while, in fact, the level of the liquid metal is dropping. As the printer reservoir empties, liquid metal is no longer available or ejected from the nozzle and printing ceases.

An implementation of the present teachings includes a printer component that helps mitigate dross buildup and the problems associated therewith, as discussed below.

FIG. 1 is a schematic cross section of a printer 100 such as a metal printer that uses magnetohydrodynamic (MHD) technology to eject droplets 102 such as metal droplets 102 onto a surface 104. Use of various aspects and structures according to the present teachings with other ejection technologies is contemplated. Further, it will be appreciated that the figures depict generalized example schematic illustrations, and an actual printer in accordance with the present teachings can include other structures that are not depicted for simplicity, while various depicted structures can be removed or modified.

The printer 100 of FIG. 1 includes a block 106 that defines a reservoir 108, a supply inlet 110, and an ejection chamber 112. While the block 106 is depicted as a single structure, it will be appreciated that the block 106 can include two or more sections that are attached together. The block 106 can be or include, for example, boron nitride, graphite, or another material that resists physical changes and damage from high temperatures encountered during use. The printer 100 further includes a nozzle 118, such as a replaceable nozzle 118. The nozzle 118 includes an orifice 120 from which the metal droplets 102 are ejected during printing. The printer 100 further includes an ejector 122 that is engaged to eject the metal droplet 102 from the nozzle 118. The ejector 122 can be, for example, an electromagnetic coil 122 that encircles the ejection chamber 112, or another type of ejector 122.

FIG. 1 further depicts a metal supply 130 which, in this implementation, is a supply reel 132 that supplies a metal wire 134 in solid form to the reservoir 108. The metal wire 134 is heated and melted within the reservoir 108 and becomes a liquid metal 136. The liquid metal 136 flows from the reservoir 108, through the supply inlet 110, into the ejection chamber 112, to the nozzle 118, and is ejected from the orifice 120 using the ejector 122. Printers including other flow paths for the liquid metal 136 are contemplated.

To eject a metal droplet 102 from the orifice 120 of the nozzle 118, a current is applied to the coil 122 which develops and creates a pulsed magnetic field through the coil 122. This pulsed magnetic field induces an MHD-based force density within the liquid metal 136 within the ejection chamber 112, which overcomes capillarity and/or surface tension of the liquid metal 136 within the nozzle 118, thereby ejecting the metal droplet 102 from the orifice 120 of the nozzle 118. It will be appreciated that contours of the supply inlet 110 and/or the ejection chamber 112 can be designed to improve, customize, and/or optimize flow dynamics of the liquid metal 136 therewithin.

As liquid metal 136 is ejected from the nozzle 118 in the form of the metal droplet 102, a level "L" of the liquid metal 136 within the reservoir 108 is monitored using, for example, a laser 142 that emits a laser beam 144 onto an upper surface 146 of the liquid metal 136. The laser beam 144 reflects from the upper surface 146 of the liquid metal 136 and onto a photosensor 150. When the upper surface 146 of the liquid metal 136 is at level $L_1$, the laser beam 144 is reflected onto position $P_1$ of the photosensor 150.

Figure 2:
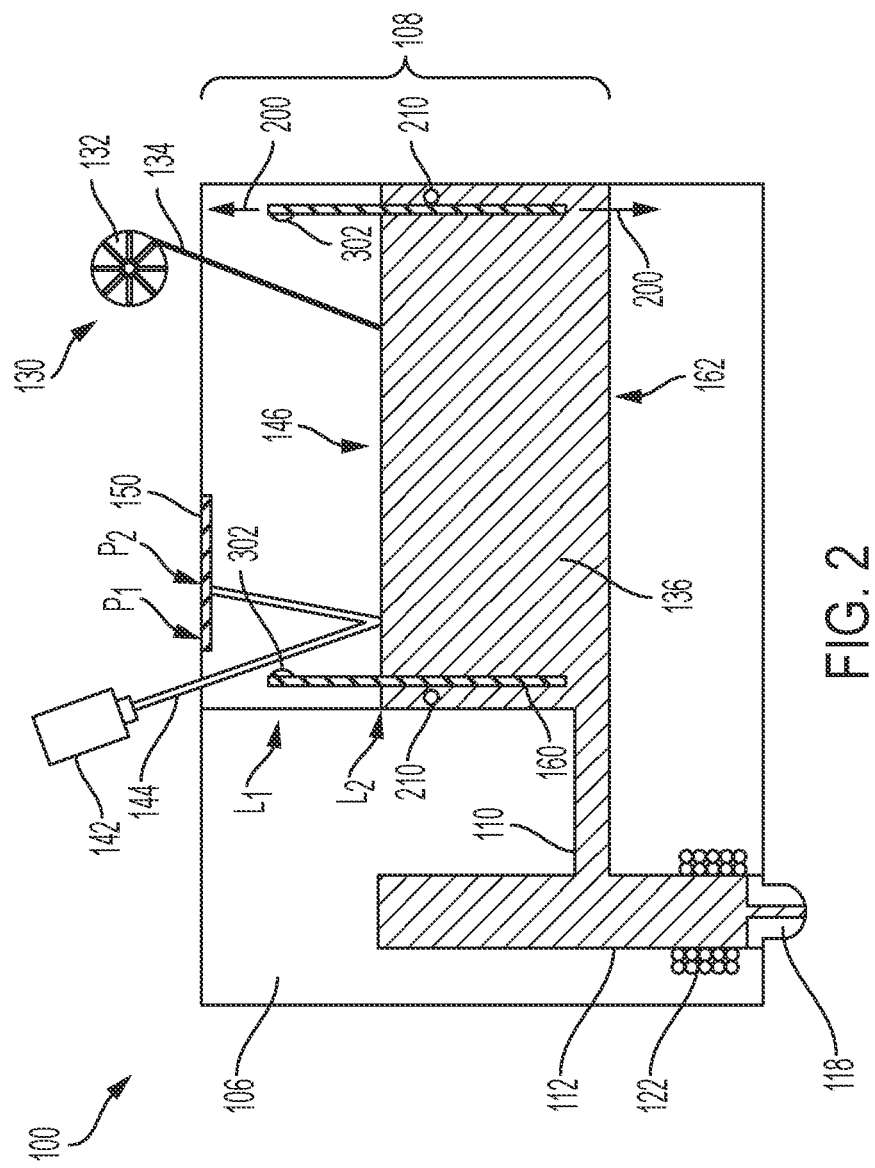
FIG. 2 depicts the printer of FIG. 1 during a printing process, where a level of liquid print fluid has decreased compared to the state of FIG. 1.

As depicted in FIG. 2, as the level of the liquid metal 136 decreases during printing, the position of the reflected laser beam 144 on the photosensor 150 changes. For example, when the upper surface 146 of the liquid metal 136 drops from level $L_1$ to level $L_2$, the laser beam 144 reflects from the upper surface 146 of the liquid metal 136 onto position $P_2$ of the photosensor 150.

Figure 3:
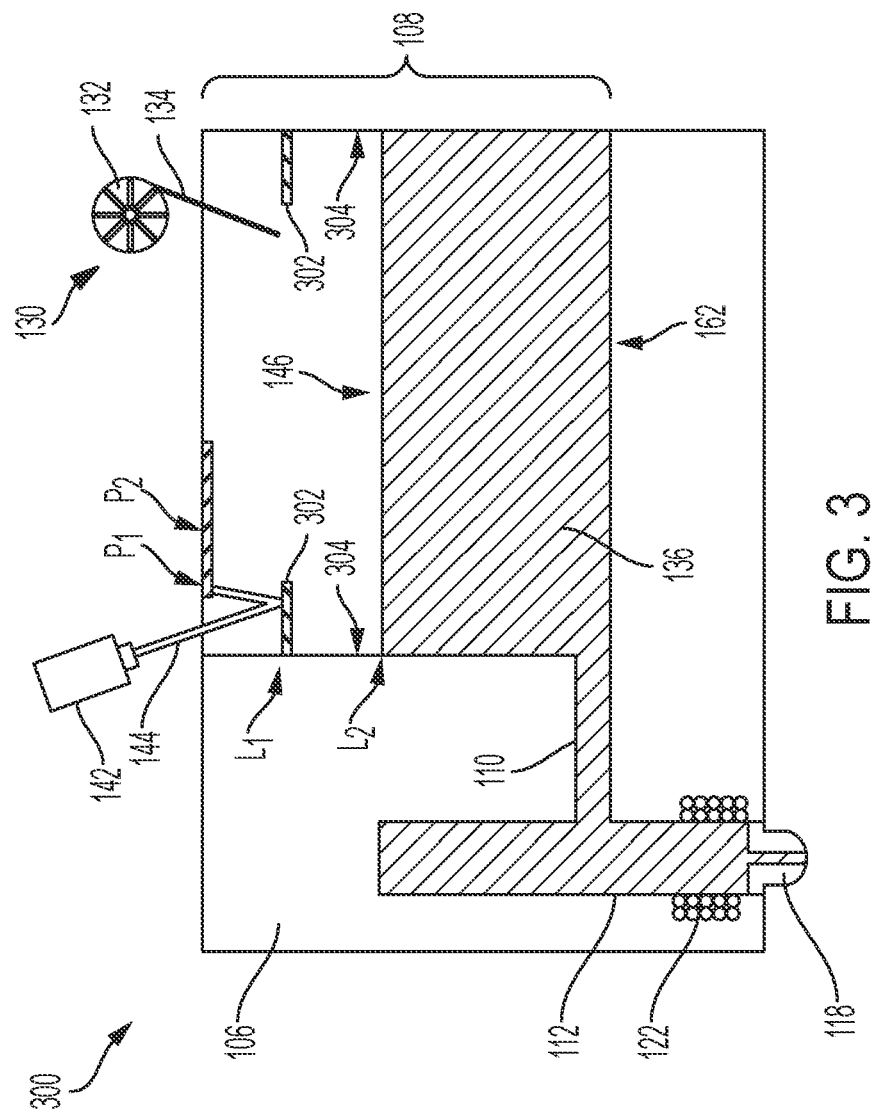
FIG. 3 is a schematic cross section depicting a dross formed on a sidewall of the reservoir of the printer, which can result in inaccurate monitoring of the level of the liquid print fluid within the reservoir.

FIG. 3 depicts a printer 300 within which dross 302 has built up on sidewall(s) 304 of the block 106 within the reservoir 108. (It will be appreciated that a reservoir 108 having a circular or oval perimeter includes one continuous sidewall, while a reservoir 108 having a square or rectangular perimeter includes four connected sidewalls.) As depicted, the liquid metal 136 has dropped during printing from level $L_1$ to level $L_2$, and the laser beam 144 reflects from the dross 302 rather than from the upper surface 146 of the liquid metal 136. As such, the printer 300 has not detected that the level of the liquid metal 136 has dropped and the liquid metal 136 requires replenishment. In the structure of FIG. 3, the liquid metal 136 will eventually be depleted and printing will cease.

Referring back to FIG. 1, the printer 100 according to an implementation of the present teachings includes an inner shell 160 (i.e., an inner sleeve or liner). The inner shell 160 can be a substructure of the printer that can be replaced by the user, for example, between printing sessions and/or during routine maintenance.

The inner shell 160 can be or include graphite, ceramic, or a metal (e.g., tungsten) or a metal alloy that has a higher melting point than the metal used as the print material. The dimensions and shape of the inner shell 160 may depend, at least in part, on the dimensions and shape of the reservoir 108 formed by the block 106 of the printer 100. For example, in plan view, the reservoir 108 may have a generally circular shape; thus, as depicted at 400 of FIG. 4, which depicts a plan view of the inner shell 160, the inner shell 160 may also have a generally circular shape. In other implementations, the reservoir 108 may have a generally square or rectangular shape, or another shape, and thus the inner shell 160 can have a generally square or rectangular shape, or another shape, respectively (not individually depicted for simplicity). In some implementations, the inner shell 160 may physically contact the sidewalls 304 and/or a bottom 162 that define, at least in part, the reservoir 108. In another implementation, the inner shell 160 may be free from contact with the sidewalls 304 that define the reservoir 108 but may physically contact the bottom 162. In some implementations as described below, the inner shell 160 may physically contact the bottom 162 during a period of use, and be free from contact with the bottom during other periods of use.

Figure 4:
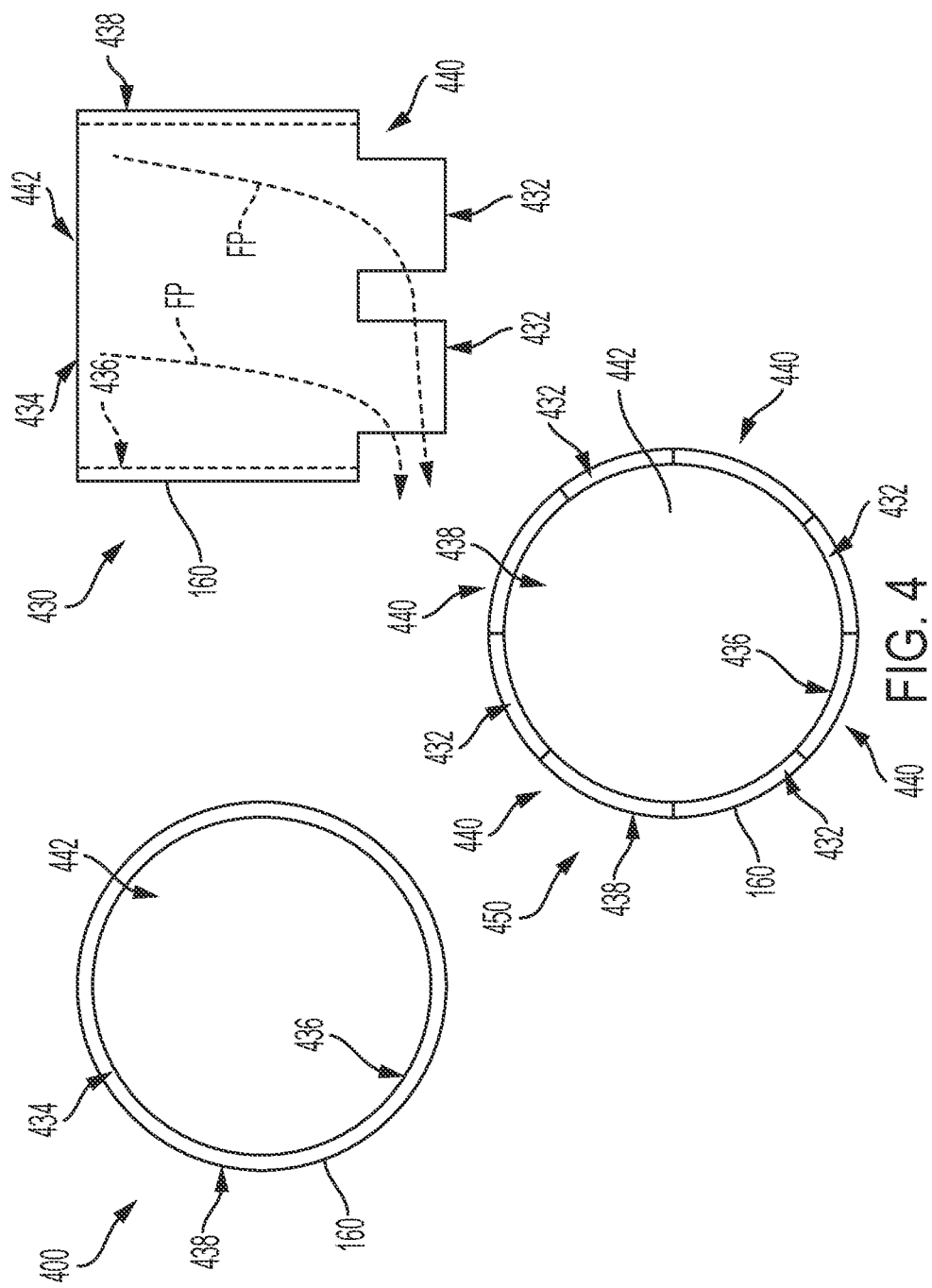
FIG. 4 depicts a top view, a side view, and a bottom view of an inner shell according to an implementation of the present teachings.

FIG. 4 depicts the plan view 400, and further depicts a side view 430 and a bottom view 450 of an implementation of the inner shell 160. In this implementation, the inner shell 160 includes a first, lower surface 432 at a first end of the inner shell 160 and a second, upper surface 434 opposite the lower surface 432 at a second end of the inner shell 160 where the second end is opposite the first end. The inner shell 160 further includes one or more interior sidewall(s) 436 and one or more exterior sidewall(s) 438 opposite the interior sidewall(s) 436. (It will be appreciated that an inner shell 160 having a circular or oval perimeter includes one continuous interior sidewall 436 and one continuous exterior sidewall 438, while an inner shell 160 having a square or rectangular perimeter includes four connected interior sidewalls 436 and four connected exterior sidewalls 438.) The lower surface 432 intersects the interior sidewall 436 and the exterior sidewall 438 at the first end of the inner shell 160. The upper surface 434 intersects the interior sidewall 436 and the exterior sidewall 438 at the second end of the inner shell 160. The inner shell 160 further defines one or more notches or slots 440 that extend through the inner shell 160 from the interior sidewall 436 to the exterior sidewall 438 proximate the first end of the inner shell 160. The slots 440 allow liquid metal 136 to flow from an inner vessel 442 that is defined, at least in part, by the interior sidewall 436 of the inner shell 160 to an exterior of the inner shell 160 and into the inlet 110. Various flow paths "FP" of the liquid metal 136 from the inner vessel 442, through the one or more slots 440, to the exterior the inner shell, and then to the inlet 110 are depicted in the side view 430.

The inner shell 160 can be either a single-piece structure or a multi-piece structure. Multi-piece implementations can include two or more structures that are either separate (e.g., physically spaced) or physically connected together. The inner shell 160 can have a thickness, from the interior sidewall 436 to the exterior sidewall 438, of from about 0.05 millimeters (mm) to about 5.0 mm, or from about 0.5 to about 3.0 mm.

During printing, the inner shell 160 can be maintained in a fixed position during the entire printing process. In this implementation, referring back to FIG. 2, dross 302 is deposited at generally a fixed location (i.e., at a fixed height) on the inner shell 160 during the printing session. However, during a maintenance or repair procedure between printing sessions, the reservoir 108 of the printer 100 is accessed and the inner shell 160 is removed and replaced. Because the contaminated inner shell 160 is replaced before a large deposit of dross 302 is allowed to form, the problem represented in FIG. 3 is avoided. In some cases, the interval for removal and/or replacement of the inner shell 160 is not sufficient for one work shift and some job printing may be interrupted.

In another implementation of the present teachings, the position of the inner shell 160 can be changed and/or adjusted during a printing session. For example, the inner shell can be repositioned 200, e.g., raised, lowered, or otherwise repositioned 200, relative to the bottom 162 of the reservoir 108 as depicted in FIG. 2, during the printing process so that only a thin coating of dross 302 forms on the interior sidewall 436 of the inner shell 160. In other words, the same volume of dross 302 forms on the surface of the inner shell 160, but the dross 302 forms over a larger surface area of the inner shell 160 due to the repositioning of the inner shell 160 in the vertical direction during the printing process. Repositioning of the inner shell 160 can be performed using an actuator 210 such as a mechanical actuator 210 or an electromechanical actuator 210 that, at least in part, physically contacts and/or is physically connected to the inner shell 160. For example, the actuator 210 can include the use of one or more rotating wheels 210 that, in conjunction with an electric motor (not depicted in FIG. 2 for simplicity), is configured to raise and/or lower, and/or otherwise reposition, the inner shell 160 relative to the bottom 162 of the reservoir 108 during printing.

One major source of the dross 302 is the supply metal stock (e.g., the metal wire 134). The more material (e.g., supply metal stock) that has run through the system, the more dross 302 that can potentially accumulate. Therefore, the amount of dross 302 is generally proportional to the amount of metal (e.g., the metal wire 134) that is fed through the printer 100. Since the dross 302 floats to the top surface 146 of the liquid metal 136, the dross 302 is mostly above the liquid metal 136 and is contained by the sidewalls 304 that enclose the supply metal stock. In a conventional printer 300 without the inner shell 160, the dross 302 can attached to, and accumulate on, the sidewalls 304 and can permanently change the surface properties, including the electrical resistivity, of the sidewalls 304. In a printer 100 using the inner shell 160, the dross attaches to, and accumulates on, the interior sidewall(s) 436 of the inner shell 160, which can be cleaned and/or replaced.

In an aspect of the present teachings, the inner shell 160 divides the reservoir 108 into two sections. A first section of the reservoir 108 is provided by the inner vessel 442 and is defined, at least in part, by the interior sidewall 436 of the inner shell 160. A second section of the reservoir is provided between the exterior sidewall(s) 438 of the inner shell 160 and the sidewall(s) 304 of the block 106 that define, at least in part, the reservoir 108.

During use of the printer 100, as depicted in FIG. 1, the metal supply 130, e.g., the metal wire 134, is fed into the reservoir 108 within the first section of the reservoir 108. In other words, the metal wire 134 is introduced into the reservoir 108 within and through the inner vessel 442 and between opposite portions of the interior sidewall 436 of the inner shell 160. Introducing the solid metal wire 134 into the reservoir 108 within the inner vessel 442 of the inner shell 160 ensures that the dross 302, which is less dense than the liquid metal 136, is contained within the inner vessel 442 as long as the upper surface 146 of the liquid metal 136 remains below the upper surface 434 of the inner shell 160. The printer 100 including the inner shell 160 are thus designed so that the upper surface 146 of the liquid metal 136, at its highest point, remains below the upper surface 434 of the inner shell 160. This ensures that any buildup of dross 302 occurs on the interior sidewall(s) 436 of the inner shell 160 and not on the sidewalls 304 that define the reservoir 108. The dross 302 can thus be removed by replacing the inner shell 160, or by removing the dross 302 from the inner shell 160, during repair or maintenance of the printer 100.

The second section of the reservoir 108 between the exterior sidewall(s) 438 of the inner shell 160 and the sidewall(s) 304 of the reservoir 108 has minimal buildup of dross 302. Some dross 302 may be introduced into this section, for example, during an initial fill of the reservoir 108 with the metal wire 134. During replenishment of liquid metal 136 that has been printed as metal droplets 102, added dross 302 is contained within the inner vessel 442.

During printing, the majority of liquid metal 136 provided to the nozzle 118 originates from the first section of the reservoir 108 (i.e., from the inner vessel 442) rather than from the second section of the reservoir 108 (i.e., from between the exterior sidewall 438 of the inner shell 160 and the sidewall 304 of the block 106 that define, at least in part, the reservoir 108). This occurs, in part, because the large majority of the volume of liquid metal 136 that is supplied to the nozzle 118 originates within the first section of the reservoir 108. The volume of liquid metal 136 within the second section of the reservoir 108 is mostly stagnant, and only a very small volume of the liquid metal 136 is supplied to the nozzle 118 from the second section.

Figure 5:
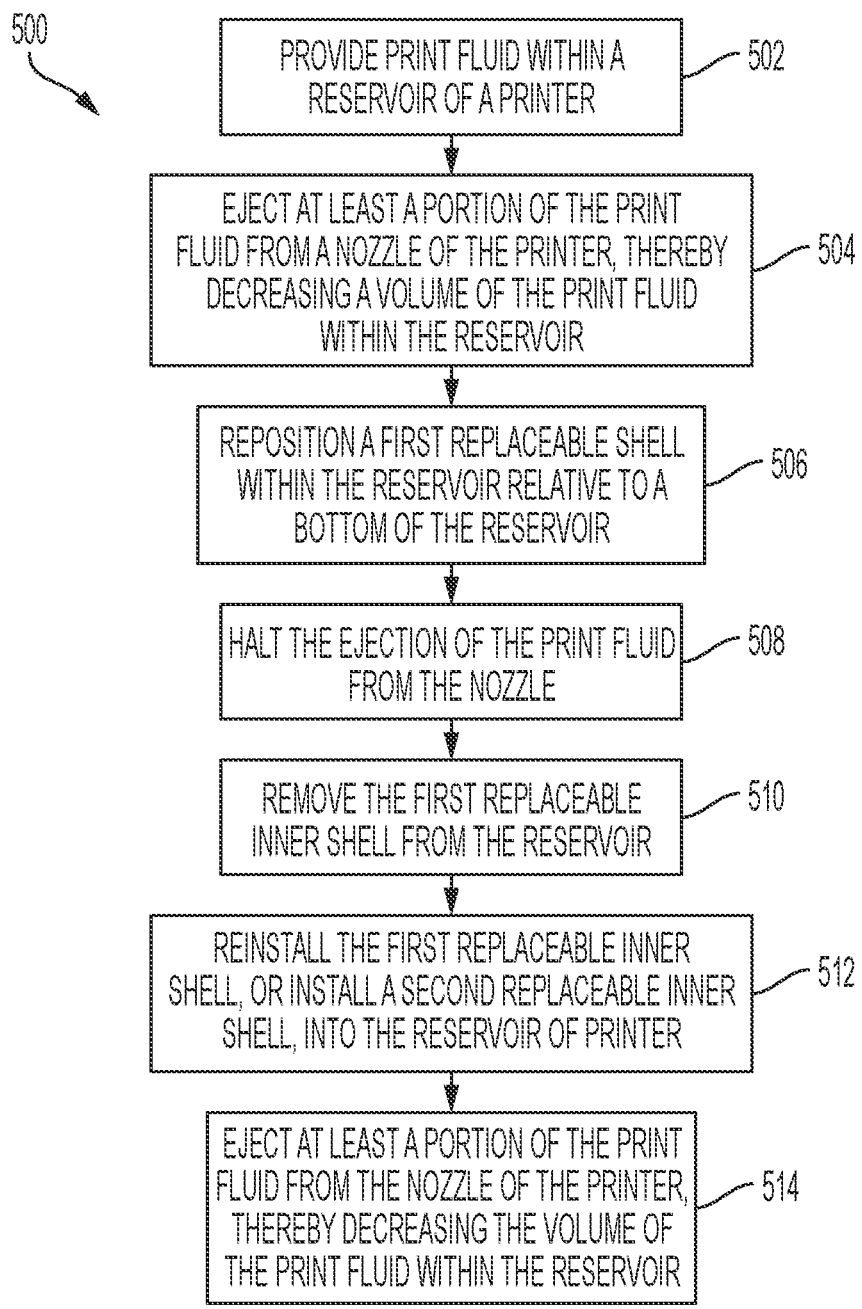
FIG. 5 depicts a method for forming a printed structure according to an implementation of the present teachings.

FIG. 5 depicts a method 500 that can be used to form a printed structure. For simplicity of explanation, and without limiting the present teachings, the method 500 of FIG. 5 is described with reference to the structures depicted in FIGS. 1, 2, and 4, although it is contemplated other implementations can include structures and method acts that are not depicted for simplicity, while various depicted structures and method acts may be removed or modified.

The method 500 can including providing a print fluid 136, such as a liquid metal 136, within a reservoir 108 of a printer 100 as at 502. This can include, for example, melting a metal wire 134 supplied from a supply reel 132 within the reservoir 108, or another subprocess. The reservoir 108 can be defined by, or provided by, a block 106 of the printer 100. At 504, the print fluid 136 is ejected from a nozzle 118 of the printer 100, thereby decreasing a volume of the print fluid 136 within the reservoir 108. For example, the volume of the print fluid 136 can decrease from a first level $L_1$ to a second level $L_2$.

In an optional implementation, during the printing, a first replaceable inner shell 160 can be raised, lowered, and/or otherwise repositioned 200 relative to a bottom 162 of the reservoir 108 as at 506.

After printing has been completed or at some other processing stage, the ejection of the print fluid 136 from the nozzle 118 is halted as at 508. The first replaceable inner shell 160 is removed from the reservoir 108 as at 510. This may require partial disassembly of the printer 100 during, for example, a maintenance or repair process. The first replaceable inner shell 160 can be cleaned, reconditioned, or otherwise processed to partially or completely remove dross 302 that has collected on the first inner shell 160, then reinstalled into the printer 100 as at 512. In an alternative to removing the dross 302, the first replaceable inner shell 160 can be discarded or recycled, and a second replaceable inner shell 160 can be installed into the printer 100 as at 512. Subsequently, the printer 100 can be reassembled. After reassembling the printer, printing can continue, for example, by ejecting at least a portion of the print fluid 136 from the nozzle 118 of the printer 100 as at 514.

An implementation of the present teachings thus mitigates problems associated with the formation of dross 302 within the printer 100. The inner shell 160 is positioned within the printer 100 such that the dross 302 forms on the removable inner shell 160 rather than on other parts of the printer 100. The inner shell 160 can then be removed for cleaning, reconditioning, or replacement. Because the dross 302 is removed from the printer 100 before excessive buildup occurs, various problems such as incorrect measurement of the print fluid 136 within the reservoir 108 as depicted in FIG. 3 can be avoided.

Figure 6:
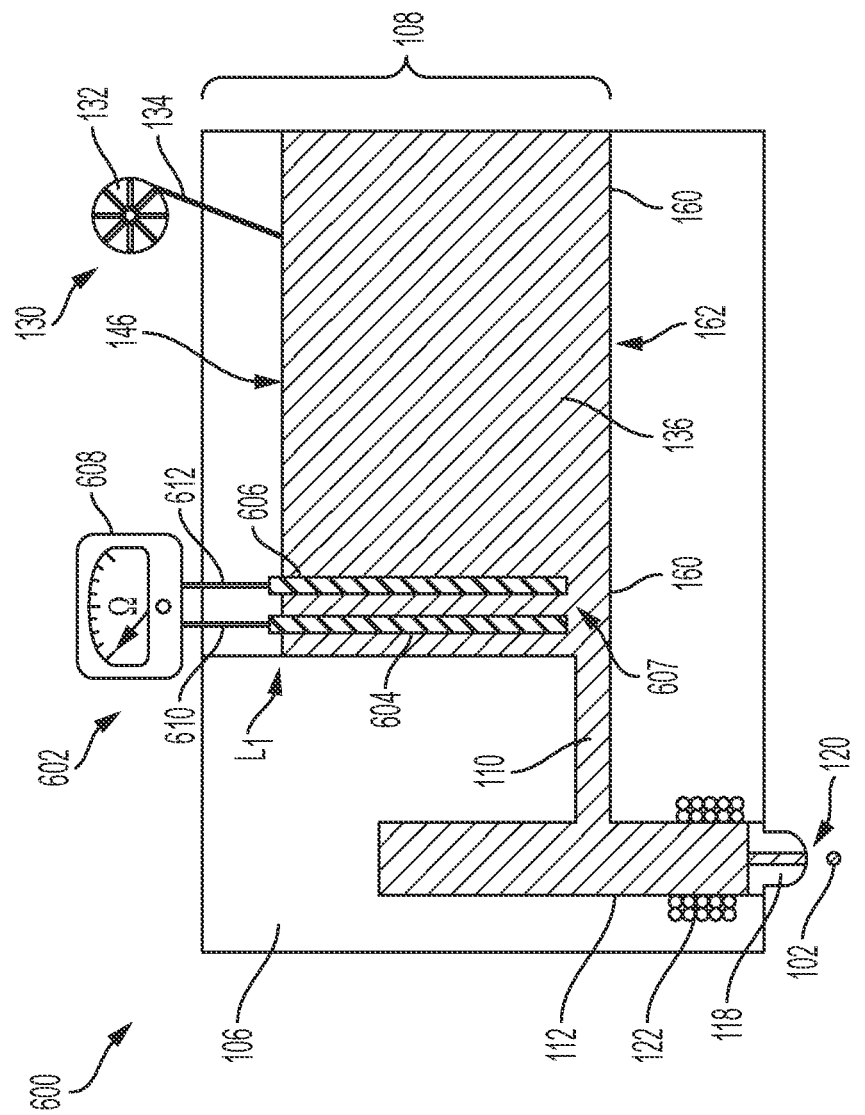
FIG. 6 is a schematic cross section of a printer including a resistor subsystem for measuring a level of a print fluid within a reservoir of the printer.
Figure 7:
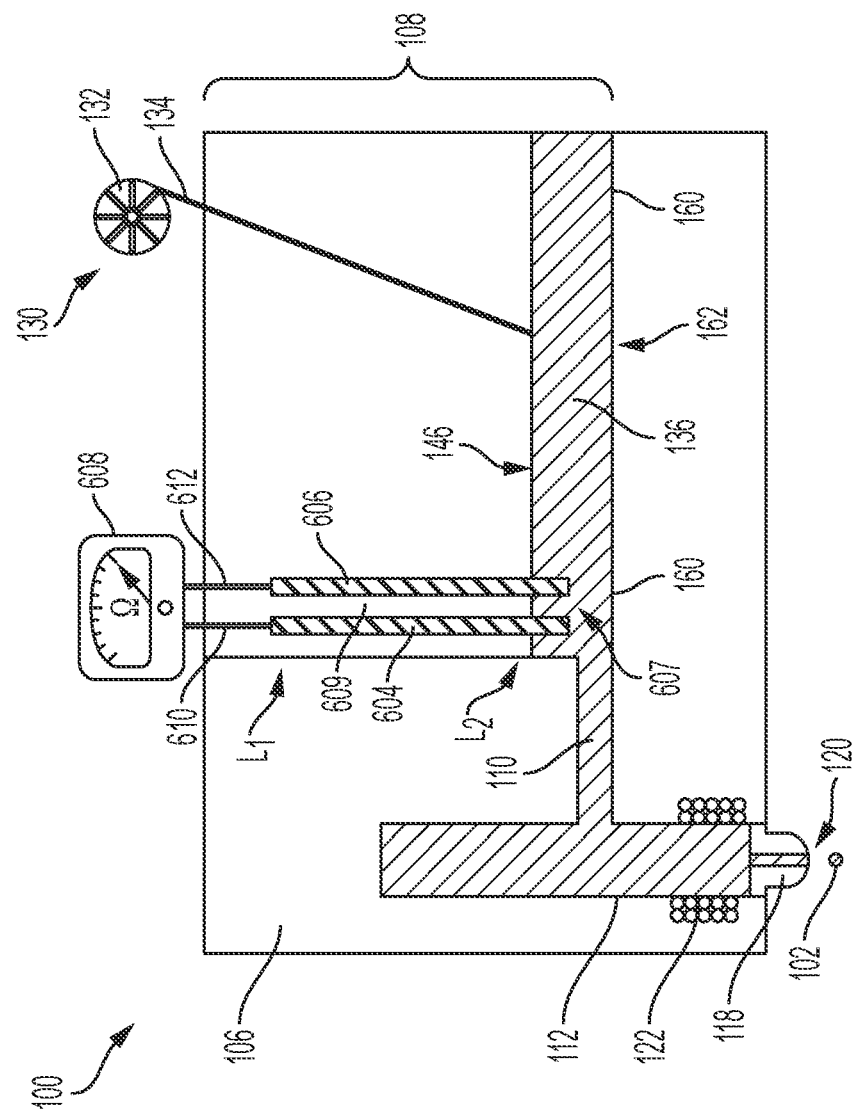
FIG. 7 depicts the FIG. 6 printer after a drop in the level of the print fluid.

Another implementation of the present teachings is depicted in FIGS. 6 and 7. This implementation includes a resistor subsystem 602 that measures the level "L" of the liquid print fluid 136 within the reservoir 108 of a printer 600, where the resistor subsystem 602 is less susceptible to incorrect readings due to dross 302 than the measurement system that uses the laser 142 and the photosensor 150. The resistor subsystem 602 can replace the laser 142 and the photosensor 150 of the implementation of FIG. 1, and thus the laser 142 and the photosensor 150 are not depicted in FIG. 6.

FIG. 6 depicts a schematic cross section of the printer 600 including the resistor subsystem 602, where the resistor subsystem 602 measures the level "L" of the liquid print fluid 136 within the reservoir 108. In FIG. 6, the print fluid 136 is at level "$L_1$," within the reservoir 108. The resistor subsystem 602 includes a first resistive electrode 604 (i.e., a first electrode 604) and a second resistive electrode 606 (i.e., a second electrode 606) that is paired with the first electrode 604. The first electrode 604 is spaced from the second electrode 606 by a gap 607. The resistor subsystem 602 further includes an ohmmeter 608, where the first electrode 604 and the second electrode 606 are separately electrically coupled with the ohmmeter 608 using a first lead 610 and a second lead 612 respectively. The electrical resistance between the electrodes 604, 606 is proportional to the length of the segment of the electrodes 604, 606 that is above the liquid metal 136. In other words, as less of the first and second electrodes 604, 606 are submerged within the print material 136 as the level "L" decreases, the electrical resistance between the first and second electrodes 604, 606 increases. Conversely, as the level "L" increases, the electrical resistance measured between the electrodes 604, 606 decreases. The electrical resistance measured between the electrodes 604, 606 can be used to determine the level of the liquid metal 136 within the reservoir 108. Thus, a method that uses the resistor subsystem 602 can provide a continuous level measurement without requiring a line of site sight from the upper surface 146. Further if the level of the liquid metal 136 drops below a bottom of the electrodes 604, 606, the resistor subsystem 602 can be designed to issue an alarm. The ohmmeter 608 is thereby configured to measure the different electrical resistances between the first electrode 604 and the second electrode 606 as the level of the print fluid 136 within the reservoir 108 changes. It will be appreciated that while a particular design of ohmmeter 608 is depicted in FIG. 6 for purposes of illustration, other types of instruments (e.g., a circuit, an integrated circuit, a sensor, an ohmmeter having another design, etc.) that measure the electrical resistance between the first electrode 604 and the second electrode 606 are contemplated.

As depicted in FIG. 6, the liquid print fluid 136 physically contacts the first electrode 604 and the second electrode 606. Particularly, the print fluid 136 fills a large portion of the gap 607 between the first electrode 604 and the second electrode 606. This results in the electrical resistance measured between the first electrode 604 and the second electrode 606 being at first resistance, where the first resistance measured by the ohmmeter 608 is relatively low and indicates that the liquid print fluid 136 within the reservoir 108 is at the high level "$L_1$."

During printing, the level of the print fluid 136 within the reservoir 108 may drop from level "$L_1$" as depicted in FIG. 6 to level "$L_2$" as depicted in FIG. 7. As depicted in FIG. 7, as the level of the print fluid 136 drops, the print fluid 136 fills a smaller portion of the gap 607 between the first electrode 604 and the second electrode 606 than in the full state of FIG. 6. As depicted in FIGS. 6 and 7, as the level "L" drops, the relatively low resistance print material 136 (e.g., aluminum) becomes increasingly replaced in the gap 607 by a relatively high resistance gas 609 (e.g., air) that is within the reservoir 108 of the printer. This results in the electrical resistance between the first electrode 604 and the second electrode 606 being at a second resistance that is higher than the first resistance, and indicates that the liquid print fluid 136 within the reservoir 108 is at the low level "$L_2$."

As the dross can accumulate on the sidewalls, the dross can also accumulate on the electrodes, thereby resulting in defective electrical contact and decreasing the accuracy of the resistivity measurements. To address the problem of electrode contamination by the formation of dross, the use of one or more hollow electrodes is proposed. Similar to the function of the inner shell proposed for dross removal, the hollow electrode(s) will provide an enclosed pool of liquid metal that is less susceptible to dross contamination, thereby providing more reliable and accurate measurements of the level of the print material. Electrical contact between the liquid metal and the inner surfaces of the electrodes (i.e., the portions of the electrodes that form the hollow center) will be the preferred electrical path for the sensing of the liquid metal within the reservoir during measurements of the level "L" of the liquid metal 136 print material.

FIG. 8 depicts a magnified upper end view 800 and magnified cross section 850 of the first electrode 604, the second electrode 606, and the gap 607 that spaces the two electrodes 604, 606 of the resistor subsystem 602. The location of the cross section 850 is shown in the depiction of the end view 800. In an implementation, the electrodes 604, 606 can each be or include a material selected from the group consisting of a graphite, a ceramic, a graphite-ceramic composite, or another suitable material. In the orientation of FIG. 8, each electrode can have a width of from about 0.2 mm to about 2.0 mm, or from about 0.5 mm to about 1.0 mm, and a height of from about 2.0 centimeters (cm) to about 10.0 cm.

The resistor subsystem 602 can include a first face 700 defined by the first electrode 604 and a second face 702 defined by the second electrode 606. The first face 700 and the second face 702 are adjacent to, and facing, each other and are separated by the gap 607. In an implementation, the gap can be from about 0.3 cm to about 2.0 cm wide.

In an optional implementation, the first and second electrodes 604, 606 can be coated with an electrical insulator 704 at locations other than the first and second faces 700, 702; in other words, the first face 700 and the second face 702 are at least partially exposed and free or generally free from the electrical insulator 704. The electrical insulator 704 can isolate the resistance measurement to only the first and second faces 700, 702, and may improve the measurement of the resistance value by the ohmmeter 608. The electrical insulator 704 can be or include a coating of, for example, silicon dioxide ($SiO_2$), a ceramic, or another suitable material.

As depicted at FIG. 8, the first electrode 604 can be physically and electrically separated from the second electrode 606 by spacers 802, where the spacers 802 are formed from an electrical insulator. The electrical insulator that forms the spacers 802 can be the same or different than the electrical insulator 704.

The first electrode 604, the second electrode 606, the electrical insulator 704, the leads 610, and the spacers 802, in an implementation, form an electrode subassembly 870. It will be appreciated that an actual electrode subassembly 870 in accordance with the present teachings can include other structures that are not depicted for simplicity, while various depicted structures can be removed or modified. The various elements of the electrode subassembly 870, including the first electrode 604, the second electrode 606, the electrical insulator 704, the leads 610, 612, and the spacers 802, should be manufactured from materials that can withstand the high temperatures they will encounter from the liquid metal 136 within the reservoir 108 during printing. In one particular implementation, aluminum has a melting point of about 660° C., and thus the first electrode 604, the second electrode 606, the electrical insulator 704, the leads 610, 612, and the spacers 802 should be sufficiently heat resistant to withstand exposure to temperatures of over 660° C., for example, temperatures of from about 900° C. to about 1000° C., or greater than about 900° C.

In an implementation, the electrode subassembly 670, including the first electrode 604 and the second electrode 606, together with the spacers 802, may form a cylinder having a generally circular cross section. The cylinder includes a hollow center defined at least partially by the first electrode 604 and the second electrode 606 as depicted, for example, in FIG. 8. Shapes other than a cylinder are contemplated, such as structures with three cross-sectional sections or legs, four cross-sectional sections or legs, or five or more cross sectional legs, where the cross-sectional sections or legs provide a hollow center, where the hollow center includes the gap 607. In other implementations, a first electrode 604 and a second electrode 606 that are paired but do not define a hollow center can be used to provide a resistance measurement. While filling the reservoir 108 with liquid metal 136, a majority of the liquid metal 136 that fills the gap 607 flows from beneath the upper surface 146 of the liquid metal 136, as the bottom ends of the electrodes that form the hollow cylinder are below the upper surface 146 of the liquid metal 136. Because the dross 302 may, in some instances, be a material that is lower in density than the liquid metal 136, the dross 302 floats on the upper surface 146 of the liquid metal 136. Forming first electrode 604, the second electrode 606, and the spacers 802 as a hollow cylinder reduces the amount of dross 302 within the gap 607. Dross 302 within the gap 607, and particularly on the faces 700, 702, may reduce the accuracy of the resistance measurement obtained by the ohmmeter 608.

Figure 9:
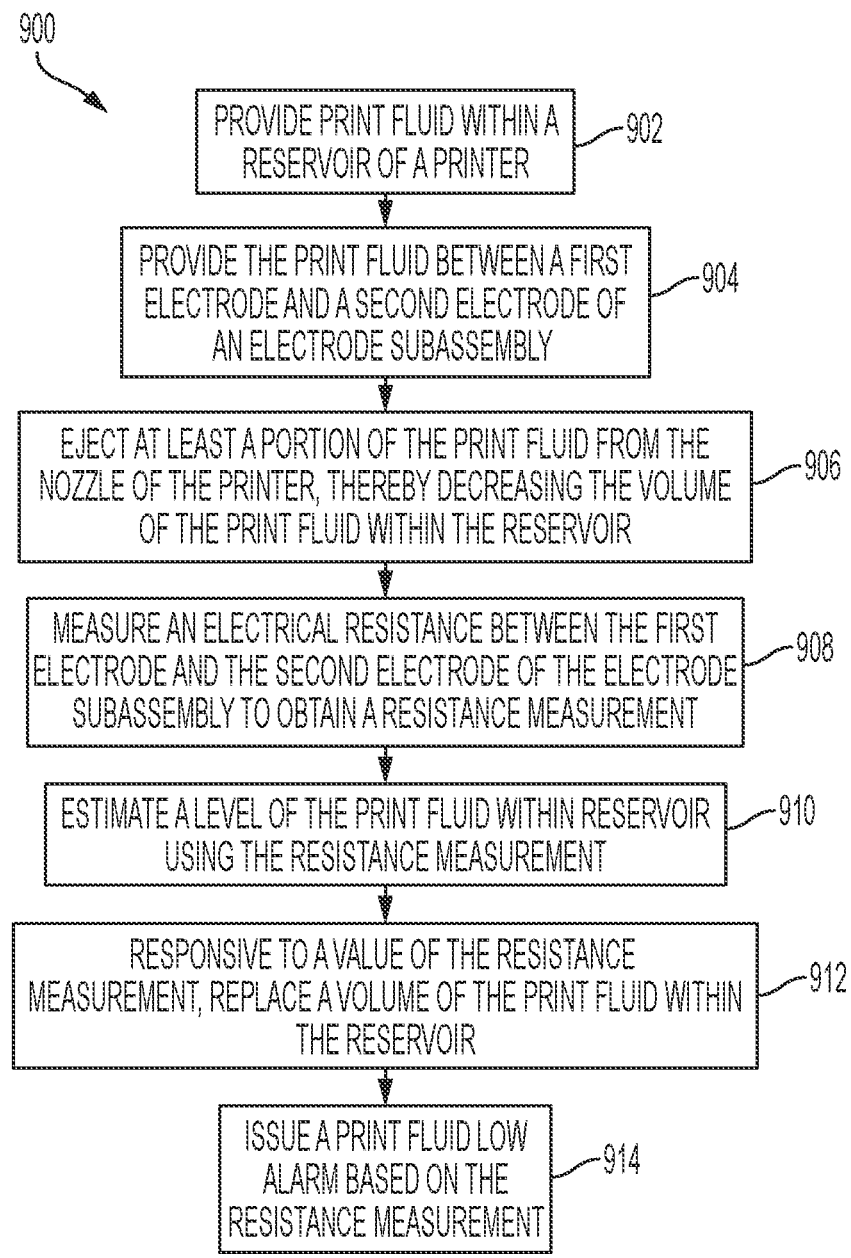
FIG. 9 depicts a method for forming a printed structure according to an implementation of the present teachings.

FIG. 9 depicts a method 900 that can be used to form a printed structure. For simplicity of explanation, and without limiting the present teachings, the method 900 of FIG. 9 is described with reference to the structures depicted in FIGS. 6-8, although it is contemplated other implementations can include structures and method acts that are not depicted for simplicity, while various depicted structures and method acts may be removed or modified.

As depicted at 902, a print fluid 136 such as a liquid metal is provided within a reservoir 108 of a printer 600. When the print fluid 136 is provided within the reservoir 108, the print fluid 136 is also provided between a first electrode 604 and a second electrode 606 that is physically and electrically spaced from the first electrode 604 by a gap 607. For example, the print fluid may be provided on (e.g., in physical and electrical contact with) the first face 700 and the second face 702. In some implementations, the first electrode 604 and the second electrode 606 can, at least in part, define a hollow center.

At 906, at least a portion of the print fluid 136 is ejected from the nozzle 118, which decreases the volume of the print fluid 136 within the reservoir 108. The electrical resistance between the first electrode 604 and the second electrode 606 is measured as the level "L" of the print fluid 136 drops within the reservoir 108 as at 908. An estimation of the level "L" of the print fluid 136 within the reservoir 108 is made using the resistance measurement, as at 910. Responsive to the measurement indicating that the level "L" of the print fluid 136 reaches a target minimum level, a volume of the print fluid 136 within the reservoir is replaced as at 912.

In some instance, for example, depletion of the metal wire 134 from the supply reel 132 or a printer malfunction, the level "L" of the print fluid 136 can drop below the bottom of the first electrode 604 and/or the second electrode 606. When this occurs, the electrical resistance measured between the first electrode 604 and the second electrode 606 suddenly increases or spikes. This state can be used to trigger a printer alarm to indicate to an operator that the level or volume of the print fluid 136 is low, as at 914.

Figure 10:
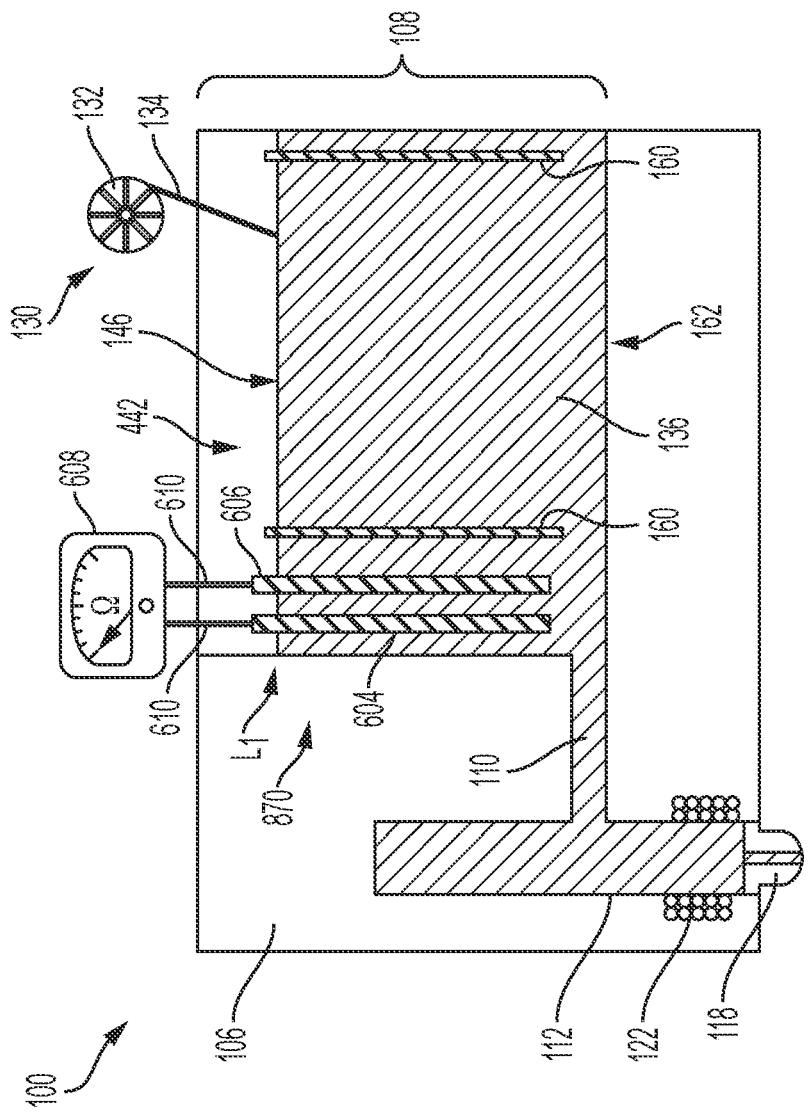
FIG. 10 is a schematic cross section of a printer including an inner shell and a resistor subsystem within a reservoir of the printer according to an implementation of the present teachings.

FIG. 10 is a side view of a printer 100 that employs both of the inner shell 160 of FIG. 1 and the electrode subassembly 870 of FIG. 8. In this implementation, the electrode subassembly 870, including the first electrode 604 and the second electrode 606, are positioned outside (i.e., exterior to) the inner vessel 442 defined by the inner shell 160. As depicted in FIG. 10, the metal wire 134 is fed from the metal supply 130 into the inner vessel 442 during the supply or resupply of the print material 136 to the reservoir 108. This generally contains any dross 302 within the vessel 442. Because the electrode subassembly 870 is positioned outside the vessel 442, and most or all of the dross 302 will be deposited within the vessel 442 of the inner shell 160, the dross 302 is less likely to interfere with the resistance measurements obtained from the electrode subassembly 870 as read by the ohmmeter 608.

Figure 11:
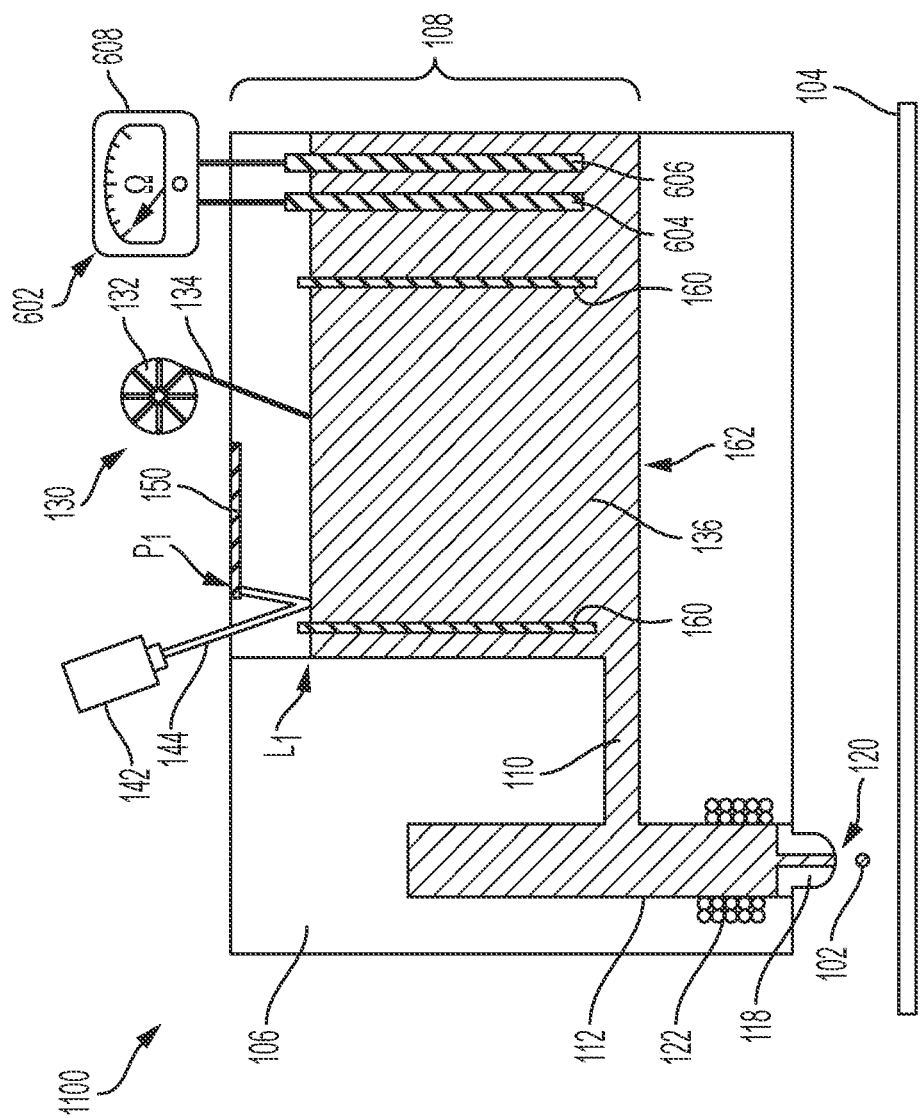
FIG. 11 is a schematic cross section of a printer according to an implementation of the present teachings, the printer including both a resistor subsystem and a laser outputting a laser beam to periodically or continuously measure a level of a print fluid within a reservoir.

FIG. 11 depicts side view of a printer 1100 that includes the resistor subsystem 602, the laser 142, and the photosensor 150. In an implementation, the printer 1100 can use both the laser 142 and the resistor subsystem 602 to periodically or continuously measure the level of the print fluid 136 within the reservoir 108. Using two different types of systems to measure the level "L" of the print fluid 136 provides redundancy in the measurement of the level of the print fluid 136 and can improve the accuracy of the print fluid level measurement.

In another implementation of the FIG. 11 printer, the laser 142 can periodically or continuously measure the level of the print fluid 136, while the resistor subsystem 602 is used to ensure that the level of the print fluid 136 does not drop below a minimum level. In this implementation, the resistor subsystem 602 detects a sudden increase or spike in the electrical resistance between the first electrode 604 and the second electrode 606, which would indicate that the print fluid level "L" has dropped below the bottom of either/both of the first electrode 604 and/or the second electrode 606. This spike in the electrical resistance can be used to trigger a printer alarm to indicate to an operator that the level or volume of the print fluid 136 is low.

Figure 12:
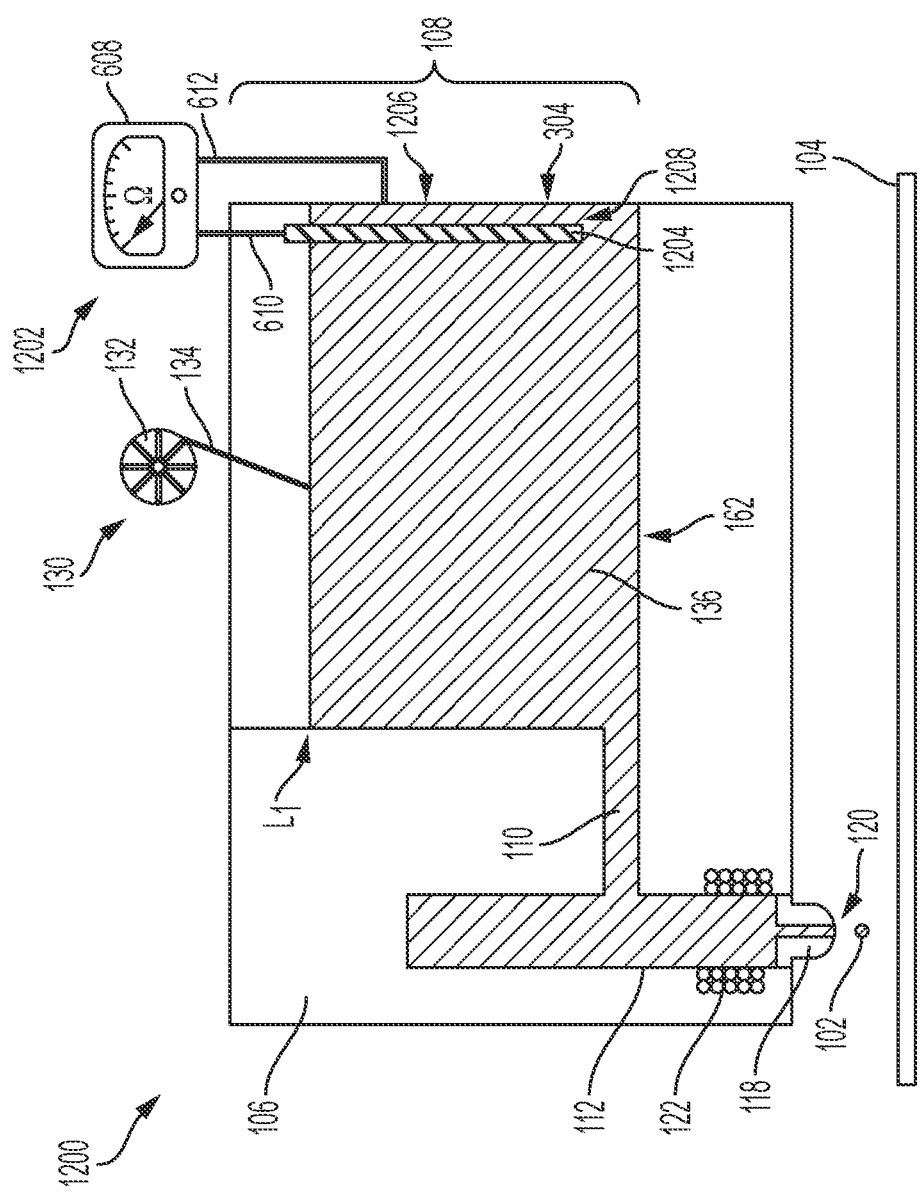
FIG. 12 is a schematic cross section of a printer according to an implementation of the present teachings that includes a resistor subsystem that employs a cylindrical first electrode and a sidewall of a reservoir of the printer as a second electrode.

FIG. 12 depicts a side view of another implementation of the present teachings that includes a printer 1200 having a resistor subsystem 1202. This implementation includes a first resistive electrode 1204 (i.e., a first electrode 1204) and a second electrode 1206. An electrical resistance is measured by an ohmmeter 608 to determine a level "L" of the print fluid 136 within the reservoir 108 as described with respect to some other implementations above.

In the implementation of FIG. 12, the first electrode 1204 can be a single solid element. The first electrode 1204 can be any suitable shape, for example, a block of material or an electrode with a hollow center. In cross section, the first electrode 1204 can have an outer perimeter shape such as, or including, a square, a rectangle, an oval, a polygon, etc. The first electrode 1204 can have a solid center, or can have a hollow center. A first electrode 1204 that defines a hollow center can have the advantages as described above, for example, a reduction in the amount of dross 302 that forms within the hollow center.

Additionally, the second electrode 1206 is provided by one of the sidewalls 304 formed by the block 106 that defines the reservoir 108. The first electrode 1204 can be electrically coupled to the ohmmeter 608 using a first lead 610 and the second electrode 1206 (i.e., the sidewall 304 provided by the block 106) can be electrically coupled to the ohmmeter 608 using a second lead 612.

Figure 13:
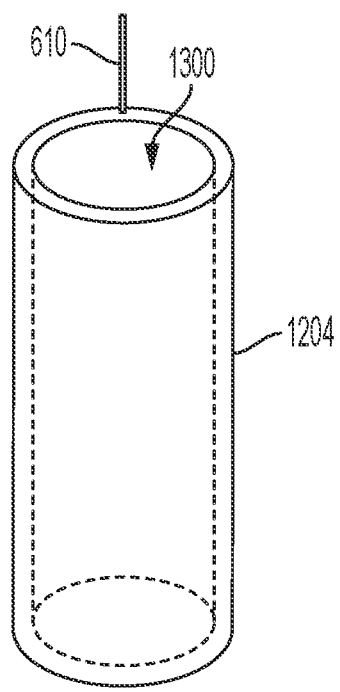
FIG. 13 is a magnified perspective depiction of the cylindrical first electrode of the FIG. 12 implementation.

FIG. 13 is a magnified perspective depiction of an implementation of the first electrode 1204 of FIG. 12. In this implementation, the first electrode 1204 is in the form of a cylinder having a hollow center 1300. The first electrode 1204 can be formed from any suitable material able to withstand the high temperatures of print material 136 which can be, for example, molten aluminum or another liquid metal. Suitable materials include, for example, graphite, ceramic, and graphite-ceramic composites.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A printer, comprising:
    a block that at least partially defines a reservoir for a print material;
    a first electrode positioned within the reservoir;
    a second electrode physically spaced from the first electrode by a gap; and
    an instrument for measuring an electrical resistance between the first electrode and the second electrode when the print material is positioned within the reservoir, wherein the first electrode defines at least a portion of a hollow center of an electrode subassembly;
    a printer component positioned within the reservoir, wherein the printer component comprises an interior sidewall that defines, at least in part, an inner vessel; an exterior sidewall opposite the interior sidewall; a first surface intersecting the interior sidewall and the exterior sidewall; a second surface opposite the first surface and intersecting the interior sidewall and the exterior sidewall; and a flow path configured for a flow of a print fluid from the inner vessel to an exterior of the printer component, wherein the first electrode and the second electrode are positioned exterior to the inner vessel defined by the printer component.

2. The printer of claim 1, further comprising the print material within the reservoir, wherein the print material is a liquid metal.

3. The printer of claim 1, wherein both the first electrode and the second electrode, at least in part, define the hollow center of the electrode subassembly.

4. The printer of claim 3, wherein:
    the first electrode and the second electrode together define, at least in part, a cylinder; and
    the hollow center is positioned at a cross section of the cylinder.

5. The printer of claim 1, wherein the first electrode and the second electrode each comprise a material comprising a graphite material, a ceramic material, or a graphite-ceramic composite material.

6. The printer of claim 1, wherein:
    the instrument is an ohmmeter;
    the first electrode is electrically coupled to the ohmmeter with a first lead; and
    the second electrode is electrically coupled to the ohmmeter with a second lead.

7. The printer of claim 1, further comprising:
    a first face defined by the first electrode; and
    a second face defined by the second electrode, wherein the first face and the second face are adjacent to, and facing, each other and are separated by the gap.

8. The printer of claim 7, further comprising a liquid metal within the reservoir, wherein the liquid metal electrically contacts the first face and the second face.

9. The printer of claim 1, wherein the printer component further comprises one or more slots that extend from the interior sidewall to the exterior sidewall proximate a first end of the printer component, wherein the printer component is configured such that the flow path is through the one or more slots.

10. The printer of claim 1, wherein the printer component, in plan view, comprises a circular shape.

11. The printer of claim 1, wherein the first electrode and the second electrode are positioned exterior to the inner vessel defined by the printer component.

12. The printer of claim 1, wherein the second electrode is a sidewall of the reservoir.

* * * * *